US011503957B2

(12) United States Patent
Valsecchi (10) Patent No.: US 11,503,957 B2
(45) Date of Patent: Nov. 22, 2022

(54) DEVICE FOR STORING AND DISPENSING COFFEE BEANS

(71) Applicant: EVOCA S.P.A., Milan (IT)

(72) Inventor: Massimiliano Valsecchi, Milan (IT)

(73) Assignee: EVOCA S.P.A., Milan (IT)

( * ) Notice: Subject to any disclaimer, the term of this patent is extended or adjusted under 35 U.S.C. 154(b) by 0 days.

(21) Appl. No.: 17/059,714

(22) PCT Filed: Jun. 5, 2019

(86) PCT No.: PCT/IB2019/054663
§ 371 (c)(1),
(2) Date: Nov. 30, 2020

(87) PCT Pub. No.: WO2019/234947
PCT Pub. Date: Dec. 12, 2019

(65) Prior Publication Data
US 2021/0361119 A1    Nov. 25, 2021

(30) Foreign Application Priority Data
Jun. 5, 2018    (IT) .......................... 102018000006050

(51) Int. Cl.
*A47J 42/50*    (2006.01)
(52) U.S. Cl.
CPC ..................................... *A47J 42/50* (2013.01)
(58) Field of Classification Search
CPC ....................................................... A47J 42/50
(Continued)

(56) References Cited

U.S. PATENT DOCUMENTS 6,349,889 B1 *    2/2002    Sandolo ................. G01G 13/16
                                                                99/286
6,827,002 B1    12/2004    Lin
(Continued)

FOREIGN PATENT DOCUMENTS

CH              710697 A1      8/2016
DE       102007008911 A1      8/2008
(Continued)

OTHER PUBLICATIONS

International Search Report and Written Opinion from International Application No. PCT/IB2019/054663 dated Sep. 10, 2019.

*Primary Examiner* — Jason K Niesz
(74) *Attorney, Agent, or Firm* — Dorsey & Whitney LLP (57) ABSTRACT

A device for storing and dispensing coffee beans, comprising a hopper defining a chamber adapted to contain the beans and provided, on the bottom, with an admission opening; a support base to support the hopper; a rotary dosing device rotatably mounted in a seat to rotate from and to a rest position, and provided with at least one cavity open on the outer surface of the rotary dosing device; and vacuum generating means to create and maintain the vacuum within the chamber. The dosing device has at least one annular groove engaged by a V-ring seal comprising a sealing lip, which, in said rest position, is compressed against an annular surface of the seat to seal the chamber and it is oriented relative to said seat, so as to be further compressed against said annular surface when subjected to a vacuum created in the chamber when air is sucked out therefrom.

9 Claims, 6 Drawing Sheets

(58) Field of Classification Search
USPC .......................................................... 141/65
See application file for complete search history.

(56) References Cited

U.S. PATENT DOCUMENTS

2004/0025703 A1   2/2004   Ming
2013/0091802 A1*  4/2013   Bentley .................. A47J 42/50
                                                     53/111 R

FOREIGN PATENT DOCUMENTS

| EP | 1066210 B1     | 3/2003  |
| EP | 1879487 B1     | 8/2008  |
| EP | 2848168 B1     | 1/2017  |
| IT | 1181556 B      | 9/1987  |
| IT | 102016000042169 | 10/2017 |
| WO | 2010001428 A2  | 1/2010  |

* cited by examiner

DEVICE FOR STORING AND DISPENSING COFFEE BEANS

CROSS-REFERENCE TO RELATED APPLICATIONS

This patent application is a U.S. National Stage of PCT International Application No. PCT/IB2019/054663 filed on Jun. 5, 2019, which claims priority from Italian Patent Application No. 102018000006050 filed on Jun. 5, 2018, the entire disclosure of each of which is incorporated herein by reference.

TECHNICAL FIELD OF THE INVENTION

The present invention relates to a device for storing and dispensing coffee beans.

BACKGROUND

As is known, devices for storing and dispensing coffee beans are commonly used in the field of the beverage vending, where it is normally associated with a grinder, which receives and grinds coffee beans and feeds metered grinded coffee to a brewing or a collection device.

Generally, devices for storing and dispensing coffee beans are sized to contain relatively high amounts of coffee and therefore the storage of the coffee beans needs to take place so as to limit the contact of the coffee beans with air as much as possible, in order to prevent oxygen and humidity from compromising organoleptic properties of the coffee.

To meet this need, devices for storing and distributing coffee beans have been developed and marketed for many years now, in which the coffee beans are stored in a container that is provided, on the bottom, with an outlet closed by a dispenser or a shutter, and that is connected to a vacuum pump operable to create and maintain the vacuum in the container, restoring it whenever necessary.

Devices for storing and dispensing coffee beans and equipped with a vacuum system are known, for example, from EP 2 848 168 B1, EP 1 879 487 B1, IT 102016000042169, WO 2010/001428 A2 and US 2004/0025703 A1.

Other devices for storing and dispensing materials with a structure similar to that of the devices for storing and dispensing coffee beans specified above are known from IT 1181556 B, EP 1 066 210 B.

SUBJECT AND SUMMARY OF THE INVENTION

The Applicant has experienced that the solutions according to the prior art, despite being satisfactory in some respects, offer a wide room for improvement in terms of effectiveness of the relevant function and/or the way in which this is achieved, particularly in terms of complexity and, consequently, cost and reliability.

It is an object of the present invention to provide a device for storing and dispensing coffee beans, which allows the above-described needs to be simply, efficiently and cost-effectively met.

According to the present invention, a device for storing and dispensing coffee beans is provided, as claimed in the appended claims.

DETAILED DESCRIPTION OF A PREFERRED EMBODIMENT OF THE INVENTION

The present invention will now be described in detail with reference to the attached Figures to allow a skilled person to produce and use it. Various modifications to the described embodiments will be immediately clear to a skilled person and the described general principles can be applied to other embodiments and applications without thereby departing from the protective scope of the present invention, as defined in the appended claims. Accordingly, the present invention is not to be limited in scope to the embodiments described and illustrated herein, but is to be accorded with the widest protective scope consistent with the principles and characteristics disclosed and claimed herein.

Figure 1:
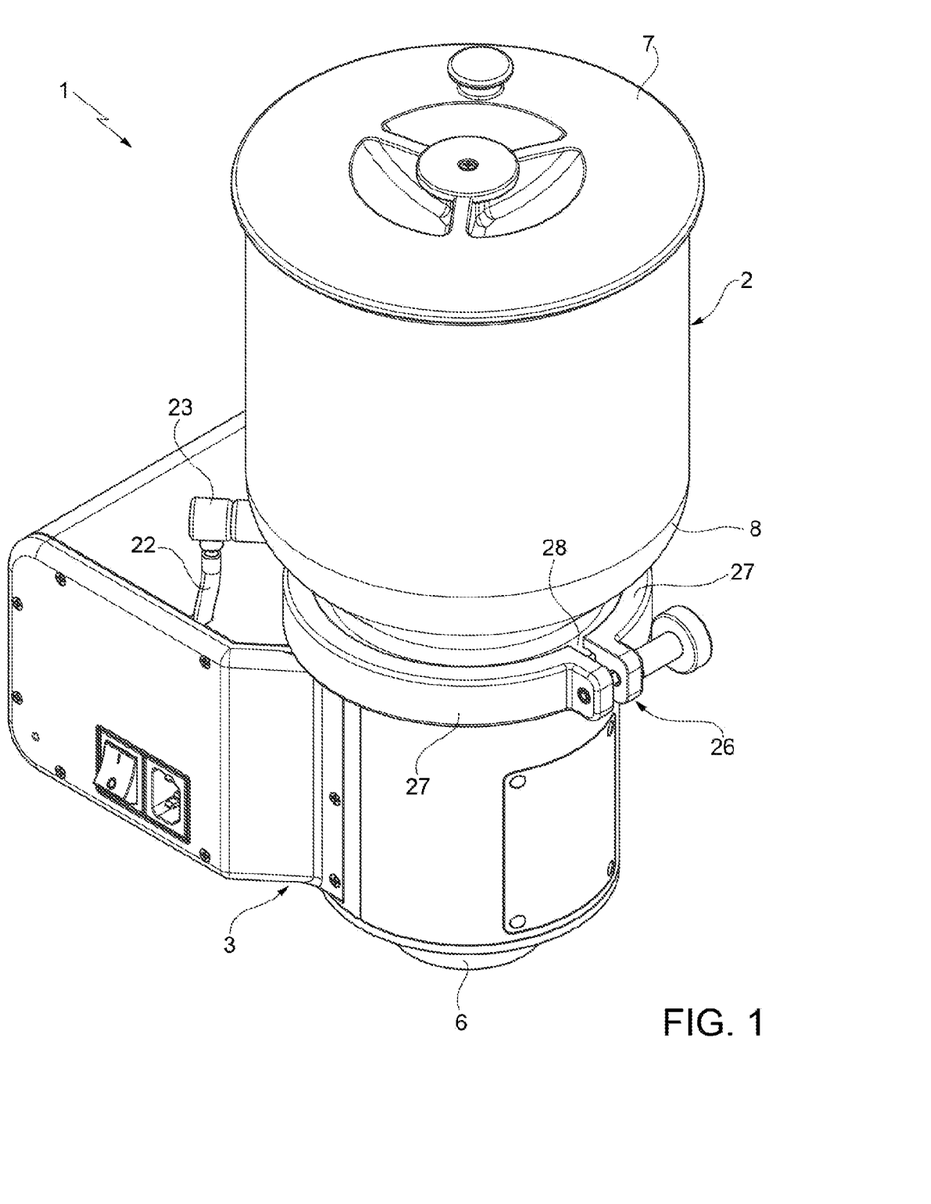
FIG. 1 shows a perspective view of a preferred embodiment of the device for storing and dispensing coffee beans according to the present invention.

In FIG. 1, a device for storing and dispensing coffee beans is globally denoted with reference numeral 1. The device 1 is adapted to be associated with a known grinder (not shown), which receives from the device 1 a dosed amount of coffee, which, after being ground, is fed directly to an automatic brewing unit in a table-top machine for preparing coffee or in an coffee vending machine.

Figure 4:
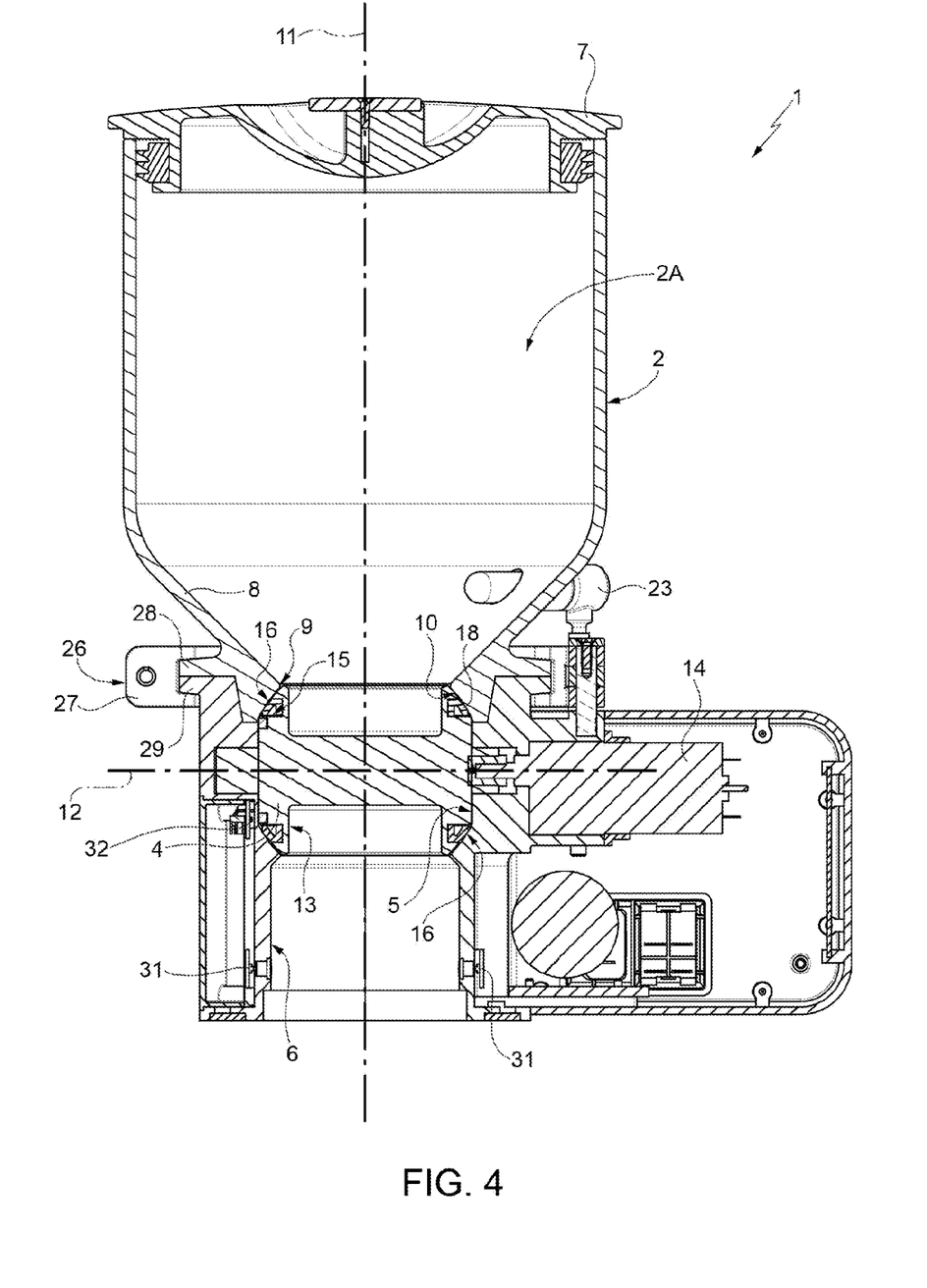
FIG. 4 is a section of the device in FIG. 1.

As shown in FIGS. 1 and 4, the device 1 comprises a funnel or hopper 2 for the coffee beans, a support base 3 for the hopper 2, and a rotary dosing device 4 housed in a seat 5 between the hopper 2 and the base 3 for transferring dosed amounts of coffee beans from the hopper 2 to an outlet channel 6 formed in the base 3 and in communication with the inlet of the grinder (not shown) arranged below the device 1.

The hopper 2 is defined by a container defining a storage chamber 2A and comprising an upper portion, preferably cylindrical and airtightly closed by a removable top cover 7 to allow the coffee beans to be loaded, and a lower funnel portion 8, which has a bottom admission opening 9 through which the coffee beans may be fed to the rotary dosing device 4.

In particular, with reference to FIG. 4, the admission opening 9 is arranged between a converging part of the lower funnel portion 8 and a cavity formed in a terminal tubular part of the upper portion 8 and bound internally by an annular surface 10 coaxial to a substantially vertical axis 11.

The annular surface 10 forms part of the seat 5 and, in particular, the part of the seat 5 that cooperates with the rotary dosing device 4 to seal the chamber 2A containing the coffee.

The annular surface 10 has a downwardly diverging flared shape. Preferably, the annular surface 10 has the shape of a spherical zone, namely the part of a spherical surface comprised between two parallel planes perpendicular to the axis 11, wherein the smaller base of the spherical zone is facing the admission opening 9 and the larger base is facing downwards.

Preferably, as in the example shown in the appended Figures, the annular surface 10 is adjacent to the converging part of the lower portion 8 and the admission opening 9 is defined by the circular area which connects the converging part to the annular surface 10.

According to a different embodiment, not shown, the annular surface 10 has a downwardly diverging frusto-conical shape.

According to a different embodiment, not shown, the annular surface 10 is formed, instead of on a terminal tubular part of the hopper 2, in a tubular portion which is integral with, or carried by, the base 3 and airtightly coupled to the converging part of the hopper 2.

Figure 5:
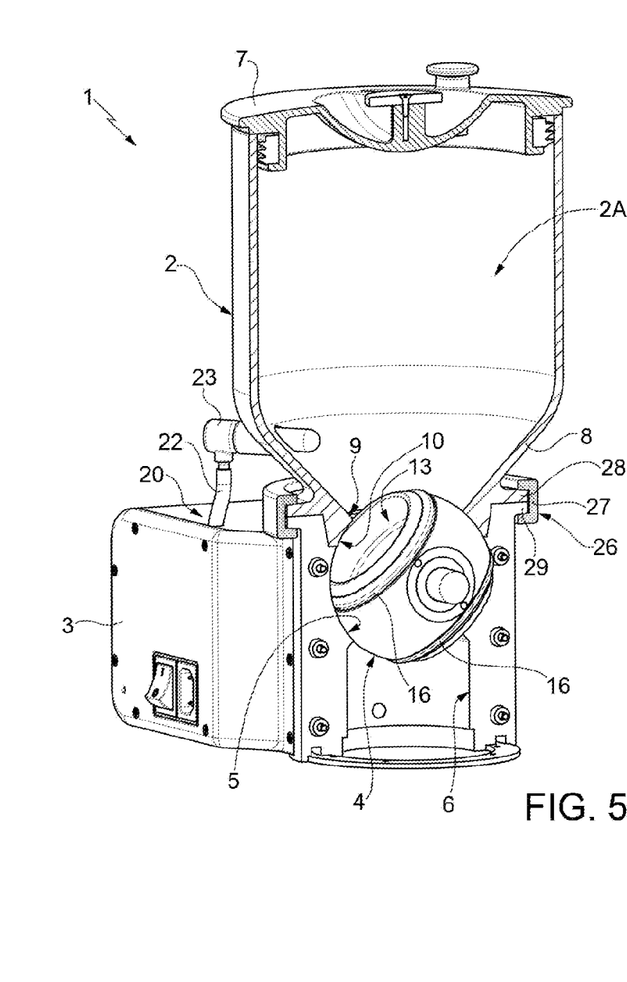
FIGS. 5 and 6 are perspective views, with parts removed for clarity, of the device in FIG. 1 in two different operational configurations.
Figure 6:
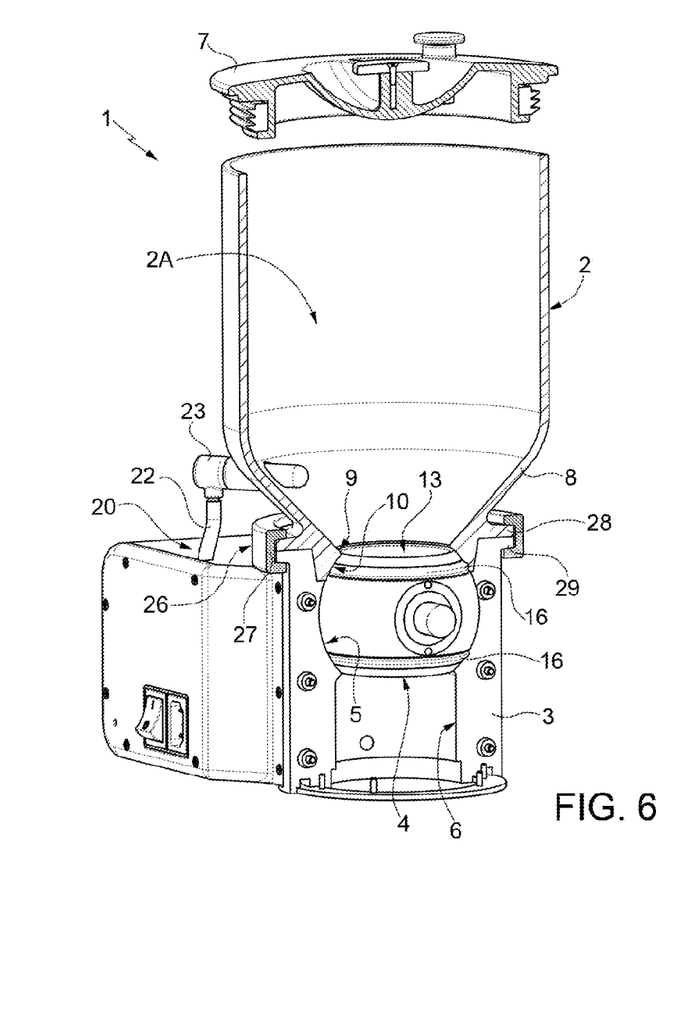

As shown in FIGS. 4, 5 and 6, the rotary dosing device 4 comprises a generally spherical body, which is rotatably mounted to the base 3 to rotate about an axis 12 perpendicular to the axis 11 and has two identical cylindrical cavities 13 formed on the surface of the spherical body, in opposing specular positions relative to a through plane for the axis 12.

The rotary dosing device 4 is powered a by an electric motor 14 housed in the base 3 and connected electrically to a control unit (not shown) to cause the rotary dosing device 4 to rotate by 180° from and to a rest and load position (FIGS. 4 and 6), in which the cavities 13 are coaxial to the axis 11, one of the two cavities 13 is facing upwards and towards the admission opening 9 and communicates with the chamber 2A to receive a dose of coffee beans, and the other cavity 13 is facing downwards and towards the outlet channel 6 to unload, into the latter, the previously loaded dose of coffee beans.

The rest and load position can be reached by rotating the rotary dosing device 4 always in the same direction or by inverting the rotation thereof.

According to one embodiment, not shown, the rotary dosing device 4 has a single cavity 13 and, consequently, successive rest and load positions are reached by rotating the rotary dosing device 4 by 360°, in the same direction or by inverting the rotation thereof.

As shown in FIGS. 4, 5 and 6, the rotary dosing device 4 has respective annular grooves 15 about the cavities 13, the grooves 15 housing respective seals 16, which are identical and selectively engaging the annular surface 10 to airtightly seal the chamber 2A.

Conveniently, the grooves 15 are formed on respective planes parallel to one another and to the planes containing the free edges of the cavities 13.

Figure 7:
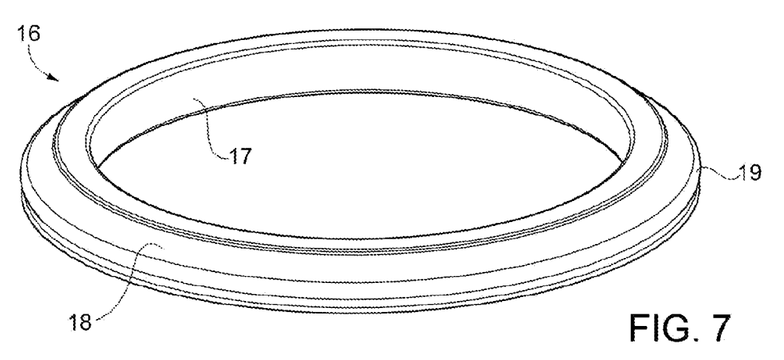
FIGS. 7 and 8 show a perspective and sectional view respectively of a detail in FIG. 5.
Figure 8:
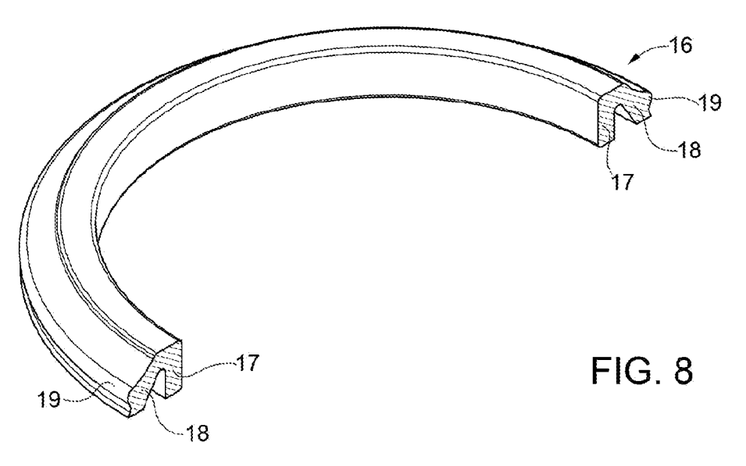
Figure 9:
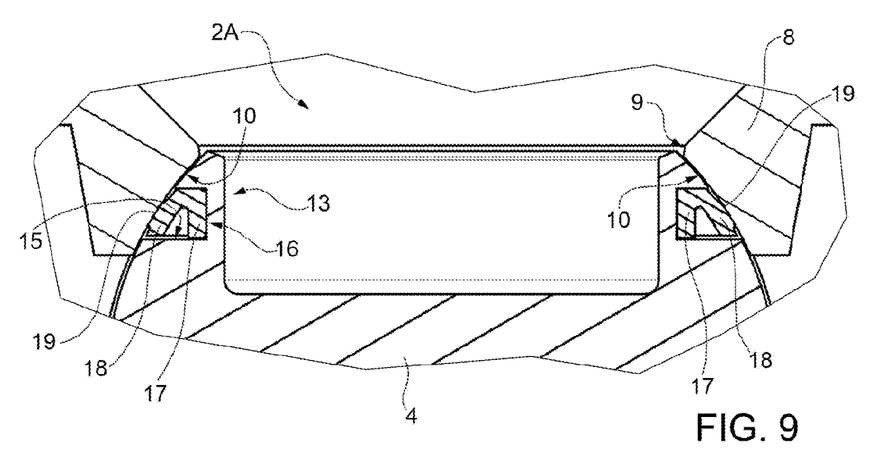
FIG. 9 shows a detail in FIG. 5 on an enlarged scale.

With reference to the Figures from 7 to 9, the seals 16 are V-Ring seals, each of which comprises a main cylindrical member 17 so sized as to interference fit the respective groove 15 and a (frusto-) conical lip 18, which is elastically biased and connected to one end of the cylindrical member 17 via an intermediate transversal portion. The seals 16 are made of highly-flexible, wear-resistant material, preferably an elastomer, such as liquid silicone 70Sh or NBR or VITON® or polyurethane.

Each seal 16 is fit in the respective groove 15 so as to be locked axially therein and is oriented so that when the seal 16 engages the annular surface 10, the conicity of the lip 18 is substantially complementary to the curvature or to the inclination of the annular surface 10.

The lip 18 has, on the outer seal surface thereof, a rounded projection 19, which, when the lip 18 is elastically deformed against the annular surface 10, exerts a pressure on the annular surface 10, ensuring an effective front dynamic seal.

The device 1 further comprises a pneumatic circuit 20 operable to create and maintain the vacuum in the chamber 2A.

Figure 3:
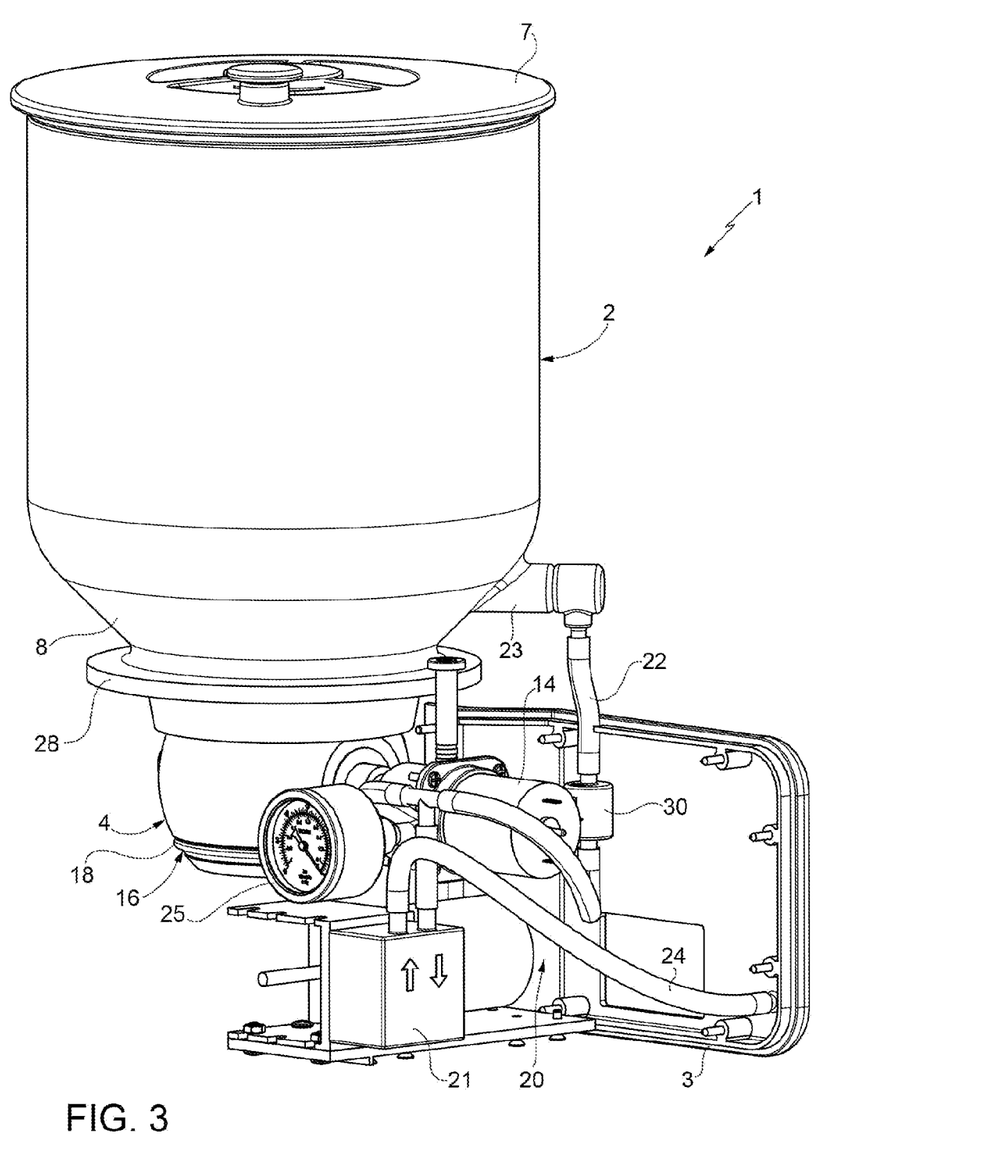
FIG. 3 shows a detail of the device in FIG. 1.

As shown in FIG. 3 and, in particular, in FIG. 4, the pneumatic circuit 20 comprises a vacuum pump 21 housed in the base 3 and electrically connected to the control unit (not shown), a suction duct 22, which connects the vacuum pump 21 to the chamber 2A through an air filter 23, and an outlet duct 24, which connects the vacuum pump 21 to the external environment.

The pneumatic circuit 20 further comprises a pressure switch (not shown) to measure the pressure inside the chamber 2A, and a vacuum gauge 25 to allow the internal pressure to be read from the outside.

Figure 2:
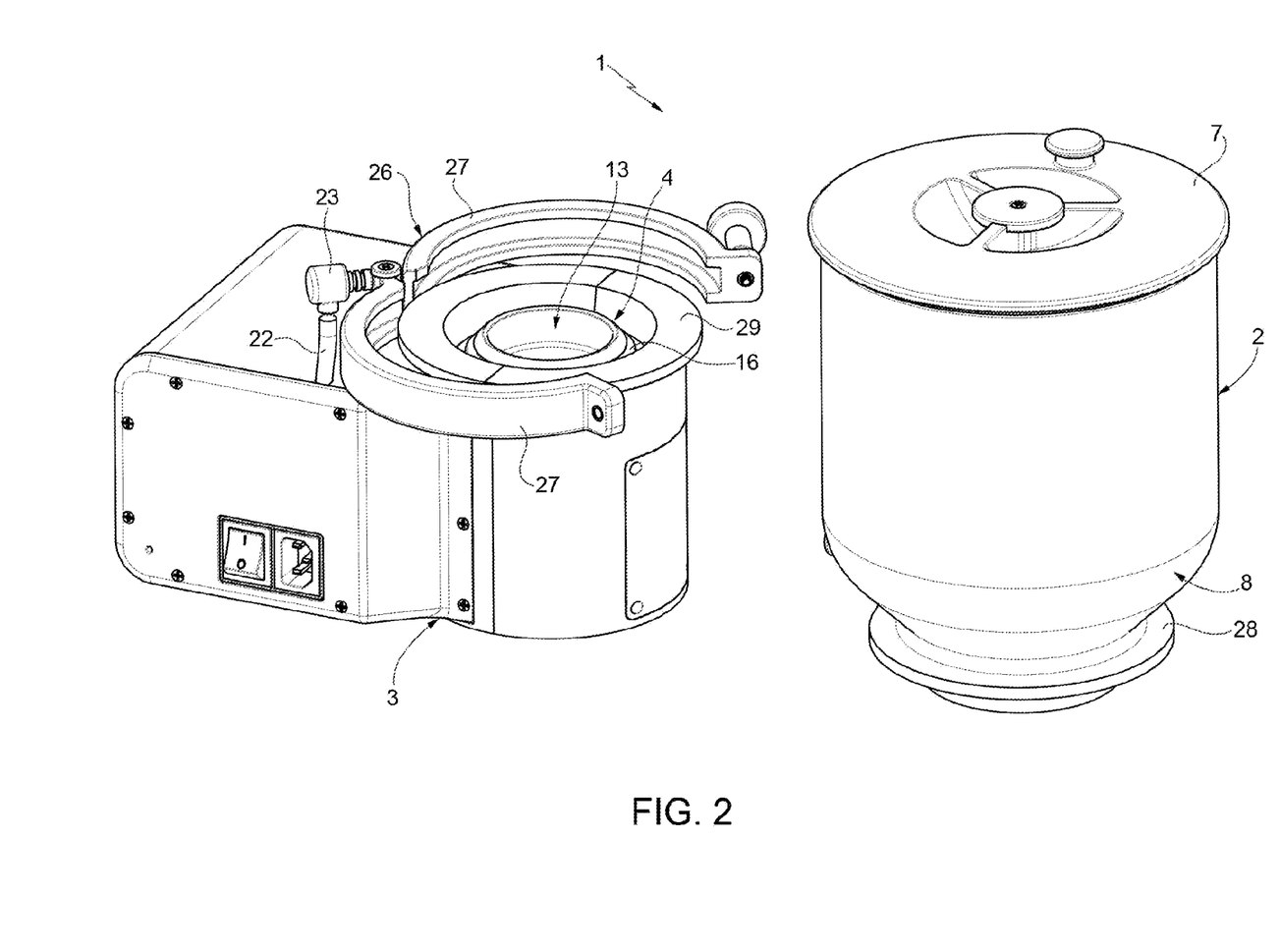
FIG. 2 shows the device in FIG. 1 in a partially disassembled configuration.

As shown in FIGS. 1 and 2, the device 1 further comprises a locking mechanism 26 configured to allow the hopper 2 to be manually mounted to, and removed from, the base 3.

The locking mechanism 26 is a clamping mechanism and comprises two jaws 27 movable from an open release position (FIG. 2), in which they allow the hopper 2 to be removed from the base 3 to allow, for example, maintenance and cleaning operations, to a closed locking position (FIGS. 1 and 4), in which the jaws 27 axially clamp a flange 28 integral with the hopper 2 and a flange 29 integral with the base 3.

In use, when the device 1 is switched on for the first time, the vacuum pump 21 sucks air from the chamber 2A until when the pressure in the chamber 2A reaches a predetermined value and the pressure switch sends a signal to the electronic control unit, which responsively stops the vacuum pump 21. A non-return valve 30 is arranged along the suction pipe 22 to prevent air from returning into the chamber 2A when the vacuum pump 21 is switched off.

The electric motor 14 is operated by the electronic control unit when a signal is received, which indicates a lack of coffee, from a level sensory system 31, conveniently formed by two level sensors arranged along the outlet channel 6 at a predetermined reading level.

When the electric motor 20 is operated, the rotary dosing device 4 performs a given number of 180° rotations, each of which results in a dosed amount of coffee beans being transferred from the hopper 2 to the outlet channel 6. The electric motor 20 is cause to stop when the level sensors 31 indicate that the coffee has reached the pre-set reading level inside the outlet channel 6.

The angular position of the rotary dosing device 4 is controlled by a position detection device connected to the electronic control unit. Preferably, the position detection device comprises a Hall effect sensor 32, which detects the passage of magnets (not shown) on the rotary dosing device 4.

During the rotation of the rotary dosing device 4 from and to the rest and load position, the chamber 2A is comes in fluidic communication with the outlet channel 6 with a consequent increase in pressure. Therefore, when the rotary dosing device 4 is cause to stop in the rest and load position, the vacuum pump 21 is operated to restore the predetermined pressure value in the chamber 2A.

Generally, even if the rotary dosing device 4 has not been operated, the vacuum pump 21 is cause to intervene each time the pressure switch measures a pressure value, which is greater than the predetermined value.

With regard to seals 16, it is worth noting that the fact the seals 16 are carried by the rotary dosing device 4 and have the particular above-described shape results in a high seal efficiency, in particular greater than solutions comprising an annular seal with a circular section and carried by the rotary dosing device 4 or the seat 5.

In fact, when the rotary dosing device 4 is caused to stop in the rest and load position, the lip 18 of the seal 16 facing the annular surface 10 seals the chamber 2A due to the effect of the pressure it exerts on the annular surface 10. This pressure, which, in the other above-mentioned known solutions, would be constant, is increased in the present invention, with a consequent improvement in the seal effect, when the vacuum pump 21 is cause to suck air from the chamber 2A and the depression generates a force, which tends to open the lip 18, further pressing the lip 18 against the annular surface 10.

The shape of the seal 16, in particular of the lip 18 and of the rounded portion 19 results in an effortless rotation start-up when the hopper 2 is under vacuum, thus preventing high starting electrical currents in the electric motor 14, which may be damaged over time.

The invention claimed is:

1. A device for storing and dispensing coffee beans, the device comprising:
 a hopper defining a chamber adapted to contain the coffee beans and provided with a bottom admission opening;
 a support base to support the hopper;
 a rotary dosing device rotatably mounted in a seat to rotate from and to a rest position, and provided with at least one cavity open on an outer surface of the rotary dosing device; and
 a vacuum pump configured to create and maintain the vacuum within the chamber;
 wherein the rotary dosing device includes at least one annular groove engaged by a V-ring seal with a sealing lip, which, in the rest position, is compressed against an annular surface of the seat to seal the chamber and is oriented relative to the seat, so as to be further compressed against the annular surface when subjected to a vacuum created in the chamber when air is sucked out therefrom.

2. The device of claim 1, wherein the rest position corresponds to a load position, in which the at least one cavity communicates with the chamber via the bottom admission opening to receive the coffee beans.

3. The device of claim 1, wherein the at least one annular groove extends around the cavity and the annular surface is arranged close to the admission opening.

4. The device of claim 1, wherein the at least one annular groove of the rotary dosing device is formed on a convex portion of an outer surface of the rotary dosing device, and wherein the annular surface has a concave shape substantially complementary to the convex portion of the outer surface of the rotary dosing device.

5. The device of claim 1, wherein the rotary dosing device has a generically spherical shape, and the annular surface has a curvilinear profile substantially matches an outer shape of the rotary dosing device.

6. The device of claim 1, wherein the annular surface is formed in a tubular portion of the hopper below the bottom admission opening.

7. The device of claim 1, wherein the V-ring seal includes a cylindrical member so sized as to interference fit the at last one annular groove and connected to the sealing lip via an intermediate transversal portion of the V-ring seal; the sealing lip is conical and is oriented relative to the seat, so that, when the sealing lip engages the annular surface, the conicity of the sealing lip is inclined so as to be concordant with, and substantially complementary to, a curvature or inclination of the annular surface.

8. The device of claim 1, wherein the rotary dosing device is rotationally symmetrical with respect to an axis thereof and comprises two opposing cavities and two of the at least one annular groove, with respective V-ring seals, each of which seals the chamber when the respective cavity communicates with the chamber through the bottom admission opening.

9. The device of claim 1, further comprising a locking mechanism configured to allow the hopper to be manually mounted to, and removed from the base; the locking mechanism includes two jaws movable from an open release position to a closed locking position, in which the two jaws axially clamp, between each other, a flange integral with the hopper and a flange integral with the base.

* * * * *